United States Patent [19]

Meyer

[11] 4,430,781
[45] Feb. 14, 1984

[54] METHOD OF PRODUCING A SCALE

[76] Inventor: Hans Meyer, 24, rue du Bugnon, 1020 Renens, Switzerland

[21] Appl. No.: 405,700

[22] Filed: Aug. 5, 1982

[30] Foreign Application Priority Data

Sep. 25, 1981 [DE] Fed. Rep. of Germany ... 3138765

[51] Int. Cl.³ .............................................. H01G 1/00
[52] U.S. Cl. .................................... 29/25.42; 29/884; 33/125 C; 33/143 L
[58] Field of Search .................... 29/25.42, 25.41, 418, 29/825, 884; 33/125 A, 125 C, 143 L; 340/870, 37; 324/61 P, 61 R; 377/92 P

[56] References Cited

U.S. PATENT DOCUMENTS

| 3,097,418 | 7/1963 | Valliere | 29/418 |
| 3,539,886 | 11/1970 | Kellerman | 29/25.42 |
| 3,777,257 | 12/1973 | Geisselmann | 324/61 R |
| 4,057,823 | 11/1977 | Burkhardt et al. | 324/61 P |
| 4,197,636 | 4/1980 | Osanai | 29/884 |

Primary Examiner—Carl E. Hall
Assistant Examiner—P. W. Echols
Attorney, Agent, or Firm—Emory L. Groff, Jr.

[57] ABSTRACT

U-shaped forms (1a) are cut in a band (1) consisting of electrically conductive material, which free cut the future measuring elements (1c) except for a connection at one side with band (1). The band (1) is placed on an insulating base (2) and connected with it. The band (1) is then cut along lines A and B, to provide individual electrically conductive elements (3a) arranged in succession and isolated from the teeth (3b) of the cut band (3). The thus produced scale can be reinforced by application of a carrier band (5).

5 Claims, 2 Drawing Figures

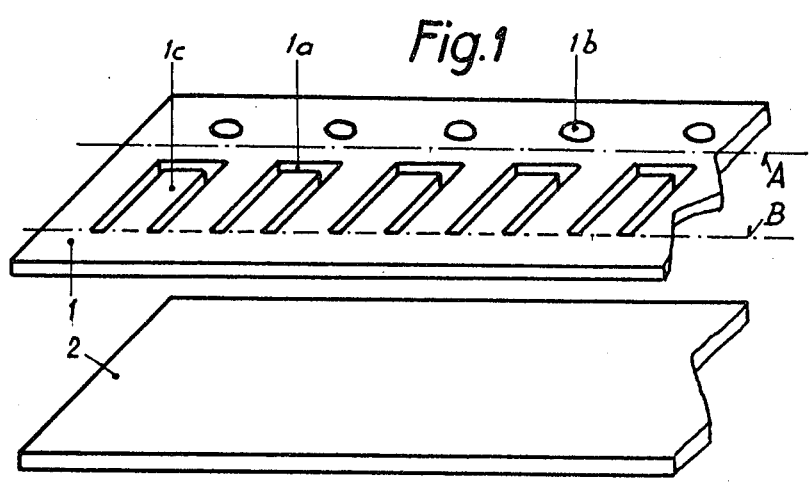
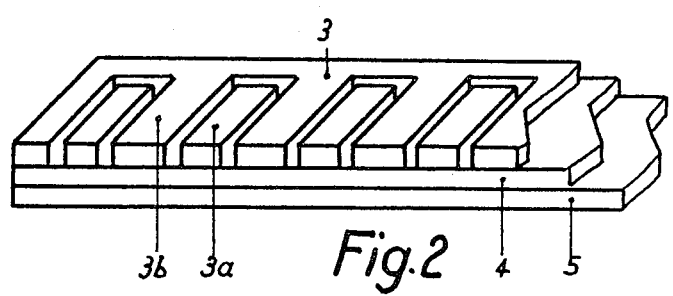

METHOD OF PRODUCING A SCALE

This invention relates to the production of a scale consisting of a carrier to which successive elements isolated from each other are applied. Such a carrier is especially suitable for capacitive scanning.

In the case of capacitively performing electronic length measuring procedures, scales are used on which elements electrically insulated from each other are applied in regular intervals. According to a known method, such scales are produced according to methods as are commonly used in the case of so-called printed circuit boards.

For technical reasons, it is now possible at considerable cost to produce such scales on which high accuracy requirements must be placed in the form of bands, as they are used especially for longer measuring sections. Therefore, the object of this invention is to provide a price-favorable manner of avoiding this problem.

The production method of my invention is characterized by the fact that the elements to be electrically isolated from one another later are first formed in a band consisting of electrically conductive material, in such a way that they are still connected to the band and the band has uninterrupted longitudinal edges, after which the band is fastened on an insulated carrier and its longitudinal edges are trimmed in such a way that the elements to be isolated are loosened from their connection with the band.

FIGS. 1 and 2 show by way of example the production method for scales according to the invention.

U-shaped forms 1a are cut by stamping in a band 1 (FIG. 1) consisting of electrically conductive material, which form the future rectangular shaped measuring elements 1c which are connected at one end with band 1 but which are free at the opposite end and the sides thereof. Holes 1b cut in band 1 at the same time serve to keep the intervals between elements 1a constant by means of gripping elements (not shown) which engage in these holes. The finished band is then set on an insulating base 2 in a second operation and connected with the base, for example, by an adhesive or by means of another suitable method thus forming a band assembly with two opposite sides.

The band assembly thus formed is then cut on the opposite sides thereof along lines A and B shown in FIG. 1 by stamping in such a way that, on the one hand, the measuring elements 1c are separated from their connection with band 1, on the other hand, the strip containing holes 1b is separated from band 1. This results in a scale (FIG. 2) wherein individual elements 3a are arranged in succession and isolated from the teeth 3b of the cut-off band 3.

The thus produced scale can now be reinforced by applying a carrier band 5. Preferably, this band is made of steel or other material, which possesses approximately the same coefficient of thermal expansion. If needed, the finished scale can be provided with a protective layer, to protect the electrical elements against damage.

The division and form of the elements can be appropriately adapted according to the prevailing electrical conditions. The forms selected in the described example are therefore merely illustrative.

The advantage of the described method and of the scale produced thereby exists predominantly in the fact that the band 1, as well as the further processing of the band with base 2 and reinforcing band 5, is possible in a continuous procedure, so that in practice, the bands can be produced in my desired length in a simple and precise manner as low costs.

I claim:

1. A method for producing a scale suitable for capacitive scanning, consisting of a plurality of successive elements which are arranged in a regular order on an insulating base, in which regular order at least certain ones of the elements are electrically isolated from each other and other of the elements are in electrical contact with each other wherein the improvement comprises the steps of: cutting a continuous band of electrically conductive material to form the elements in such a way that all of the elements have at least partial connections with the band and the band has uninterrupted longitudinal edges, fastening said band on an insulating base in order to obtain a band assembly composed of two layers and removing the longitudinal edges of the band assembly by cutting said band assembly in such a manner that said certain ones of the elements to be isolated are separated from their connections with the continuous band of electrically conductive material and said others of the elements remain connected to said continuous band.

2. A method according to claim 1 wherein, the cutting of said successive elements is performed by a stamping action on the electrically conductive band.

3. A method according to claim 1 wherein, holes are cut out in the electrically conductive band which serve to maintain the equal intervals of the elements.

4. A method according to claim 1 wherein, said base is provided with a reinforcement band applied to it on the side opposite the electrically conductive band.

5. A method according to claim 4 wherein, said reinforcing band possesses a coefficient of thermal expansion which corresponds approximately to that of steel.

* * * * *